May 14, 1935.  M. WARE  2,001,229
CAR BRAKE
Filed Feb. 17, 1934  2 Sheets-Sheet 1
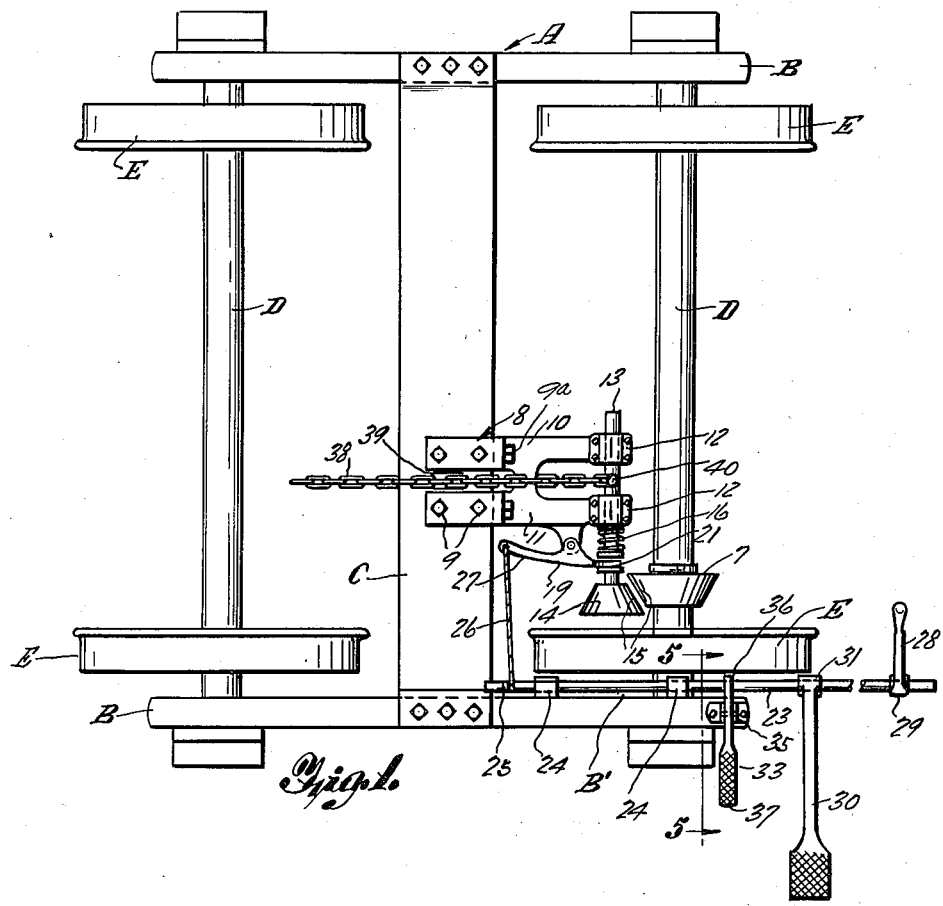
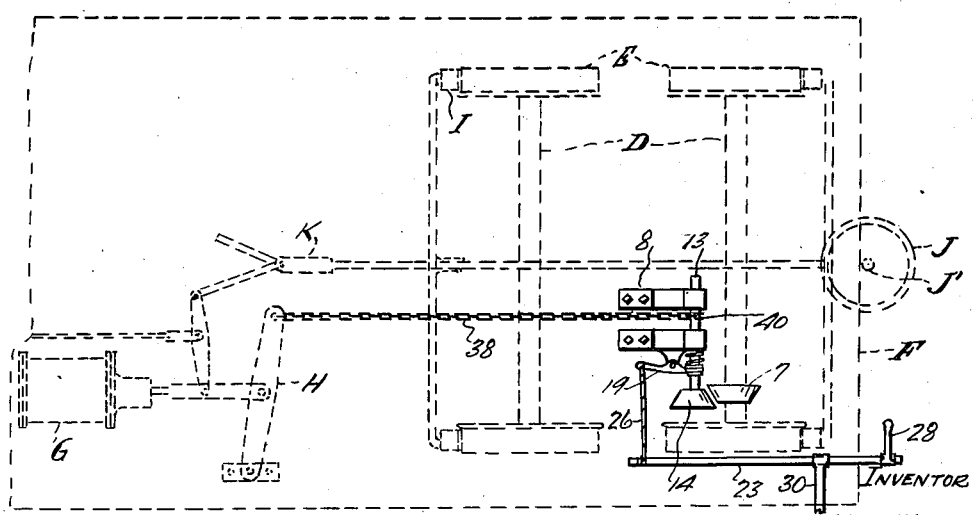
INVENTOR
MACK WARE
By Adam E. Fisher
ATTORNEY May 14, 1935.  M. WARE  2,001,229
CAR BRAKE
Filed Feb. 17, 1934  2 Sheets-Sheet 2
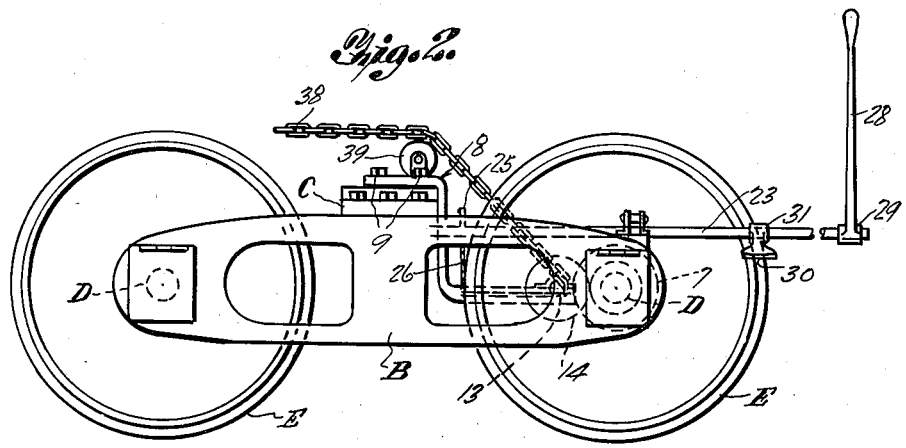
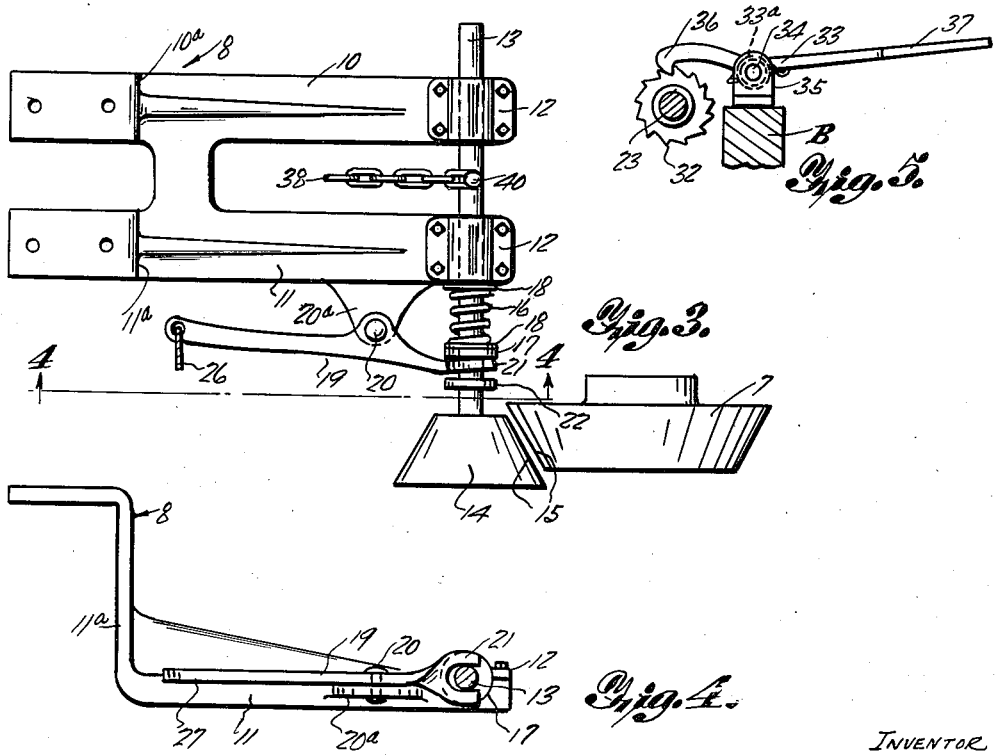
INVENTOR
MACK WARE
BY Adam E. Fisher
ATTORNEY Patented May 14, 1935

2,001,229

UNITED STATES PATENT OFFICE 2,001,229

CAR BRAKE

Mack Ware, Houston, Tex., assignor of one-half to Joseph E. Robinson, Sr., Houston, Tex.

Application February 17, 1934, Serial No. 711,623

3 Claims. (Cl. 188—145)

My invention relates to improvements in car brakes for railroad cars of all kinds.

The main object is to provide a manually controlled braking means for use in connection and addition to the usual air brake equipment and which is so arranged that it may be operated and set without climbing to the top of the car to the hand wheel located there as is the case at present.

Another object is to provide a brake in which the action is positive and increases with the strain against it and which is connected positively to the air brake equipment without complicated mechanism liable to breakage.

Another object is to provide a brake which may be set by a hand lever or foot pedal both conveniently located for operation from the ground or lower step at the side of the car.

A further object is to provide a brake of this kind in a simple, practical and durable form comprising a brake or friction cone wheel mounted on the car truck axle and a mating wheel mounted on a shaft supported alongside the axle in a bracket secured to the truck, said shaft being slidable axially through the bracket under control of a remote hand lever or foot pedal to bring the cone wheels into engagement and the shaft being restricted against rotation by a chain fastened to it and running to the service cylinder or suitable part of the air brake equipment.

With these and other objects in view the invention resides in the novel construction and arrangement of parts as hereinafter fully set forth and claimed, reference being had to the accompanying drawings wherein:

Figure 1 is a plan view of a conventional form of railroad car truck equipped with my brake, the brake being shown in disengaged position.

Figure 2 is a side elevation of the structure shown in Figure 1.

Figure 3 is an enlarged plan view of the brake alone, the control shaft, pedal and lever being omitted.

Figure 4 is a sectional view along the line 4—4 in Figure 3.

Figure 5 is an enlarged section along the line 5—5 in Figure 1.

Figure 6 is a diagrammatic plan view of the brake as applied to a car truck and connected to the air brake equipment, the brake operating means and its connecting chain being shown in full lines and the remaining structure in broken lines.

Referring now with more particularity to the drawings a conventional form of a railroad car truck is represented at A comprising the side frame members B and central cross beam C, the axles D and wheels E. In accordance with my invention a cone or tapered brake or friction wheel 7 is secured on one axle D adjacent one end thereof and made of some dense and hard conventional friction material. A heavy reinforced bracket 8 is mounted on the cross beam C by bolts 9 and includes spaced parallel bearing arms 10 and 11 extended laterally from the beam out toward the axle D carrying the brake wheel 7 and inwardly thereof, said arms terminating in bearings 12 having conventional lubricating means as usually employed in such installations. A brake shaft 13 is slidably and rotatably mounted through these bearings 12 parallel with the axle E and at its outer end a conical or tapered brake or friction wheel 14 is rigidly affixed, this wheel being also of suitable friction material. It will be noted that the two brake wheels 7 and 14 taper oppositely, that is, as here shown the wheel 7 on the axle tapers outwardly while the other 14 tapers inwardly and it will be readily understood that by shifting or sliding the brake shaft 13 inwardly the complementary angular peripheral faces 15 of the wheels will be brought into engagement and both wheels will rotate while the truck A is in motion along the track. Normally the brake shaft 13 is moved in the opposite direction or outwardly by means of an expansion coil spring 16 coiled around the shaft and braced between the end of one bearing 12 and a collar 17 rigidly secured to the shaft inwardly of the brake wheel 14. Bearing washers 18 are placed at each end of the spring 16 to reduce wear thereon.

A shifting fork or lever 19 is fulcrumed intermediate its ends at 20 on a bearing ear 20a extended from the bearing arm 11 and is forked at one end 21 to embrace and freely receive the brake shaft 13 just outwardly of the collar 17, this forked end playing between this collar and another 22 spaced outwardly therefrom as shown. An operating shaft 23 is journaled in bearings 24 along and within one truck frame side member B in the cleft or space B' usually found between this member and the adjacent wheel E, said shaft extending from a point adjacent the cross beam C out endwise from the truck A a sufficient distance to reach to and slightly project beyond the end of the car (F in Figure 6) beneath which the truck is mounted. A radially extended arm or finger 25 is provided near the inner end of this operating shaft 23 and is connected by a cable or chain 26 to the free end 27 of the fork 19. A hand lever 28 is secured at 29 to the operating shaft near its outer end and in such position as to clear the end of the car and a foot pedal 30 is secured at 31 to the shaft inwardly of the lever and is arranged to project laterally from the car adjacent the usual steps or ladder (not shown) thereon. Inwardly of the foot pedal 30 a ratchet wheel 32 is secured to the operating shaft 23 and a locking lever or latch 33 is fulcrumed at 34 in a bearing 35 on the frame side member B and provided with a pawl 36 at its inner end adapted to engage this ratchet wheel. The opposite outer end 37 of the latch extends laterally outward from the truck for convenience in operation. The latch may be spring set by a torsional spring 33a to normally engage the ratchet wheel 32 if desired.

The brake operating means as so far described is adapted for connection to and operation with the usual air brake equipment as represented diagrammatically in Figure 6 in which F as aforesaid designates the railroad car only one end of which is shown and G designates the air brake service cylinder, H the hand brake lever, I the usual brake shoes operated by either the hand wheel J or by the air brake pull rod K. This is conventional equipment or one form thereof and is shown merely for purpose of exemplification, it being understood that the present invention may be connected to any standard air brake system now in use. Ordinarily the hand wheel J which is located at the top and end of the car is connected by a chain (not shown) wound around the lower end of its shaft J' to the hand brake lever H. In accordance with this invention the chain leading from the lever H to the shaft J' is disconnected from the latter and another chain 38 (or the same chain appropriately altered) is extended from the lever over a pulley 39 secured on the cross beam C and is then fastened at its end 40 to the brake shaft 13 between the bearings 12 as shown.

In use either the hand lever 28 or the foot pedal 30 may be pulled outward or pushed downward respectively, either operation rotating the shaft 23 so as to pull on the cable 26 and swing the shifter fork 19 on its bearing 20. The fork 21 thus moves the brake shaft 13 axially through the bearings 12 bringing the brake wheel 14 into contact with the wheel 7 on the truck axle D. The car being in motion both wheels 7 and 14 will thus be rotated and the brake shaft 13 will turn winding the chain 38 on the axle and exerting a strain on the hand brake lever H so that the brake shoes I will be set and the wheels E locked stopping the car. Upon moving the hand lever 28 or pedal 30 in the opposite direction or releasing them by first releasing latch 33 the spring 18 will disengage the wheels 7 and 14 releasing the brakes as will be apparent. The braking action or force increases directly as the strain against it since it is the rolling action of the car itself that sets the brakes rather than simply man power as is the case in previous arrangements now in use. The brake operating means of course works with equal efficiency on movement of the car in either direction and when not in use does not interfere in any way with the operation of the air brake equipment. The hand lever 28 is conveniently operated by a man on the ground or roadbed at the end of the car while the foot pedal 30 is placed in position for operation by a man standing on the usual step or ladder at the side of the car, neither operation requiring that the operator climb clear to the car top to reach the hand wheel J. The shaft 23 is locked in braking position with the brakes set by engagement of the pawl 36 on the latch 33 with the ratchet wheel 32 the teeth of which are properly cut for this purpose and the parts may be released to release the brakes by disengaging the latch as will be evident. Cars may thus be "spotted", locked in position or slowed down gradually as needed simply by proper manipulation of the control lever, pedal and latch as will be readily apparent.

It will be noted that the arms 10 and 11 of the bracket 8 extend downward at 10a and 11a and are bolted at 9a alongside the cross beam C to a point substantially level of the axle D before extending outward as described, this formation increasing the strength of the bracket as well as properly supporting the brake elements carried thereby.

While I have herein set forth a certain preferred embodiment of my invention, it is understood that I may vary from the same in minor structural details, so as best to construct a practical device for the purpose intended, not departing from the spirit of the invention and within the scope of the appended claims.

I claim:

1. In combination with a car truck including a frame and axle and air brake equipment, a tapered friction wheel on the axle, a bracket mounted on the frame, a brake shaft journaled and slidably mounted in the bracket adjacent the axle, a tapered friction wheel on the brake shaft adapted to be brought into engagement with the friction wheel on the axle by slidable adjustment of the brake shaft, and a chain secured at one end to the brake shaft and connected to the air brake equipment, an operating shaft journaled alongside the car truck, a shifter fork fulcrumed on the bracket and forked at one end to embrace the brake shaft, collars secured on the brake shaft at each side of the said fork, a coil spring on the brake shaft adapted to normally urge the friction wheels out of engagement and a cable connecting the operating shaft and shifter fork whereby the friction wheels may be engaged by rotation of the operating shaft a hand lever and foot pedal on the operating shaft, a ratchet wheel on the shaft, and a latch mounted on the truck frame and adapted to engage the said ratchet wheel to lock the operating shaft in adjusted position.

2. In a brake mechanism for mounting upon a car truck including frame, axle and conventional air-brake equipment, the combination of a tapered friction wheel on the axle, a brake shaft journaled and slidably supported adjacent and parallel to the axle, a tapered friction wheel on the brake shaft arranged complementally to and adapted to be moved into engagement with the tapered wheel of the axle thru the slidable movement of the brake shaft, a chain secured at one end to the brake shaft and connected at its opposite end to the air brake equipment, an operating shaft journaled in the truck frame perpendicularly to the axle and brake shaft the forward end thereof projecting substantially beyond the frame, a hand lever at the outer end of the operating shaft, a foot lever extended from the operating shaft inwardly of the hand lever, and means connecting the operating shaft to the brake shaft to impart sliding movement to the latter as the former is rotated.

3. In a device of the kind described for mounting upon a conventional car truck including a frame, axle and conventional air-brake equipment, an operating shaft journaled in the truck frame perpendicularly to the axle the forward end thereof projecting beyond the end of the frame, a hand lever at the outer end of the operating shaft, a foot lever extended from the operating shaft inwardly of the hand lever, and brake operating mechanism controlled by the said operating shaft.

MACK WARE.